United States Patent
Hehn

[19]

[11] Patent Number: 5,854,963
[45] Date of Patent: Dec. 29, 1998

[54] APPARATUS AND METHOD FOR THE HANDLING OF LIGHT-SENSITIVE LAYER CARRIERS

[75] Inventor: Wilfried Hehn, München, Germany

[73] Assignee: Agfa-Gevaert AG, Leverkusen, Germany

[21] Appl. No.: 862,063

[22] Filed: May 22, 1997

[30] Foreign Application Priority Data

Jun. 28, 1996 [DE] Germany ............. 196 25 963.0

[51] Int. Cl.[6] ................... G03G 21/00; G03B 27/60
[52] U.S. Cl. .............. 399/345; 355/73; 399/98; 399/343
[58] Field of Search ................... 355/30, 73, 76; 399/98, 162, 305, 388, 397, 345, 343; 15/1.51, 256.5

[56] References Cited

U.S. PATENT DOCUMENTS

| | | | |
|---|---|---|---|
| 4,108,547 | 8/1978 | Stemmle | 355/76 X |
| 5,307,114 | 4/1994 | Nitsch et al. | 355/73 X |
| 5,386,274 | 1/1995 | Sanpe et al. | 399/101 |
| 5,655,203 | 8/1997 | Thayer et al. | 399/345 |

FOREIGN PATENT DOCUMENTS

| | | |
|---|---|---|
| 41 26 578 A1 | 2/1993 | Germany. |
| 44 20 823 A1 | 12/1995 | Germany. |
| 64-032282 | 2/1989 | Japan. |
| 01-185583 | 7/1989 | Japan. |

*Primary Examiner*—Arthur T. Grimley
*Assistant Examiner*—Sophia S. Chen
*Attorney, Agent, or Firm*—Darby & Darby

[57] ABSTRACT

A carrier for photosensitive sheets of copy paper is cleaned to remove adherent paper particles. The carrier can be an endless belt in which case a cleaning member bears against the lower run of the belt. The carrier can also be a turntable. If the turntable is unable to move horizontally, a cleaning member for the turntable is mounted on a pivotal arm so that the cleaning member can be brought to the turntable. On the other hand, if the turntable is shiftable along a horizontal direction, the cleaning member can be stationary and the turntable is then moved to the cleaning member when the turntable is to be cleaned.

8 Claims, 2 Drawing Sheets

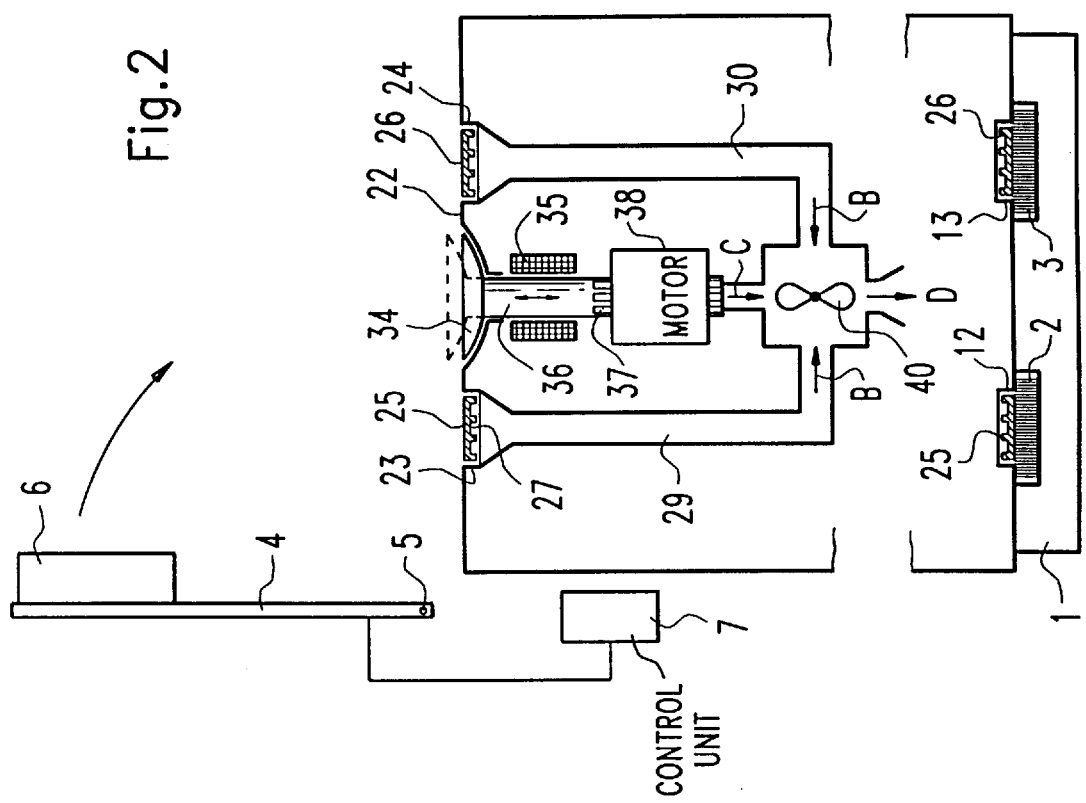
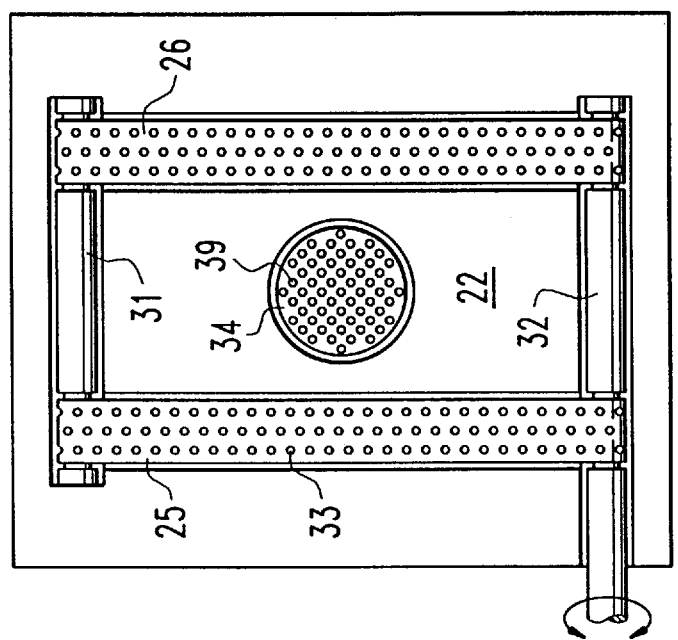

APPARATUS AND METHOD FOR THE HANDLING OF LIGHT-SENSITIVE LAYER CARRIERS

BACKGROUND OF THE INVENTION

The invention relates to the manipulation of photographic material.

The German Offenlegungsschrift No. 41 26 578 discloses a photographic copier in which individual sheets of photographic material are advanced through a copying station by conveyor belts. The sheets are held on the belts by suction. The copier is further equipped with a rotational table which is likewise subjected to suction and can, if required by the selected format, rotate the sheets 90 degrees.

The German Offenlegungsschrift 44 20 823 illustrates a photographic copier which again contains a rotational table exposed to suction. Here, however, the table can be shifted linearly so that the table is able to rotate individual sheets of photographic material and also convey them through the copying station.

A suction transport system allows the photographic sheets to be positioned very accurately at little expense. It has been found, however, that the positioning accuracy at high speeds of advance decreases with increasing operating time because of the rapid accelerations and decelerations.

SUMMARY OF THE INVENTION

It is an object of the invention to provide an apparatus which enables improved positioning accuracy to be obtained at high speeds of advance.

Another object of the invention is to provide a method which allows the positioning accuracy at high speeds of advance to be increased.

The preceding objects, as well as others which will become apparent as the description proceeds, are achieved by the invention.

One aspect of the invention resides in an arrangement for displacing photographic material. The arrangement comprises a movable carrier, means for attracting the photographic material to the carrier, and a cleaning member for automatically cleaning the carrier. The attracting means may include a source of suction.

The invention is based on the recognition that particles adhere to the cut edges of photographic material. When the photographic material is drawn onto the surface of a carrier for transport or a change in orientation, at least some of the particles are deposited on the surface. These particles greatly reduce the friction between the photographic material and the carrier.

The adherence can be increased to a level which is adequate even at high transport speeds by increasing the attraction between the photographic material and the carrier. However, when the adherence is too great, photographic material can develop so-called pressure exposures which significantly reduce image quality.

By automatically cleaning the carrier in accordance with the invention, it becomes possible to operate with a relatively small attractive force even at high transport speeds. This enables pressure exposures, as well as deformation of the photographic material, to be greatly reduced or eliminated.

The carrier may include an endless conveyor belt in which case the cleaning member may be arranged to continuously contact the lower run of the belt. By way of example, the cleaning member can here be a brush or rubber comb. In an apparatus, e.g., a copier, where the conveyor belt draws in and removes articles of photographic material along the same direction, the conveyor belt should complete a full revolution between the time that one article is drawn in and the time that the next article is drawn in. This allows the cleaning member to operate on the entire belt.

The carrier can also take the form of a plunger-like or piston-like member and, under such circumstances, continuous cleaning is not possible. If the plunger-like member is freely movable, e.g., by means of an XY drive, the cleaning member can be mounted stationarily under certain conditions. The plunger-like member can then be moved to the cleaning member at intervals.

If the plunger-like member is rotatable on an axis but is not movable transverse to such axis, it is preferred for the cleaning member to be mobile. For instance, the cleaning member may be installed at one end of a lever which is pivotally supported at its other end.

The carrier can further be in the form of a table. Cleaning of a carrier which is constructed as a plunger-like member or a table is advantageously performed periodically. In fast apparatus, this allows high positioning accuracy to be achieved constantly. Consecutive cleanings can be carried out after a predetermined time interval or after the carrier has undergone a predetermined number of operating cycles. The manner in which the period between consecutive cleanings is established depends strongly upon the mode of operation of the apparatus containing the carrier.

Many photographic copiers include a calibrating filter which can be pivoted into the optical path in order to perform a test exposure for calibration of the copier. The cleaning member can here be secured to the pivoting mechanism for the filter at little or no additional expense. However, the control unit for the filter must be reprogrammed accordingly.

Cleaning may be accomplished by moving the carrier and the cleaning member relative to one another. It is immaterial whether the carrier or the cleaning member moves or whether the relative movement is linear or rotational.

Another aspect of the invention resides in a method of operating with a carrier for photographic material. The method comprises the steps of attracting at least one article of photographic material to the carrier, moving the carrier during the attracting step to displace the article, and cleaning the carrier automatically. The attracting step may be performed using suction.

The method can further comprise the steps of removing the photographic article from the carrier, and attracting a second article to the carrier. The cleaning step may here be performed between the removing step and the step of attracting the second article. However, it is also possible to carry out the cleaning step during the moving step.

Additional features and advantages of the invention will be forthcoming from the following detailed description of preferred embodiments when read in conjunction with the accompanying drawings.

BRIEF DESCRIPTION OF THE DRAWINGS

FIG. 1 is a plan view of a copy material support unit in a copying station according to the invention;

FIG. 2 is a sectional view through the support of FIG. 1;

DESCRIPTION OF THE PREFERRED EMBODIMENTS

Figure 3:
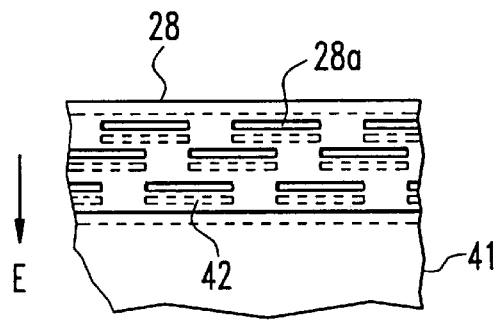
FIG. 3 is a fragmentary plan view of a suction regulating device in the support of FIG. 1.

FIGS. 1 and 2 illustrate a support unit in a copying station of a photographic copier or printer in accordance with the invention. The support unit is designed to hold photographic copy paper or copy material, which is sensitive to light, while the copy paper is exposed to light coming from an original, e.g., a negative, to be copied. An image of the original is formed on the copy paper during exposure. The copy paper is here assumed to be in the form of individual sheets which are transported into the copying station one after the other.

The support unit includes a support having an upper surface 22 on which a copy sheet rests during copying. The support surface 22 is provided with a pair of parallel elongated grooves 23 and 24 which receive the respective upper runs of two endless conveyor belts or transporting bands 25 and 26. The conveyor belts 25,26 are carriers which function to transport the copy sheets into and out of the copying station. The conveyor belts 25,26 pass around two rollers 31 and 32, and the roller 32 is driven by a non-illustrated reversible motor as indicated by the double-headed arrow in FIG. 1.

Three parallel passages 27 are formed in the lower surface of, and run circumferentially completely around, each conveyor belt 25,26. A sheet or plate 28 illustrated in FIG. 3 extends along the grooves 23,24 directly underneath the conveyor belts 25,26. The sheets 28 bound the passages 27 from below and cooperate with the passages 27 to define enclosed channels running along the grooves 23,24. Suction apertures 33 extend from the passages 27 to the upper surfaces of the conveyor belts 25,26 on which the copy sheets rest.

A turntable or rotational platform 34 is mounted in the copy sheet support. The turntable 34 serves as a carrier for, and serves to rotate, the copy sheets. The turntable 34 is provided with a hollow shaft 36 which extends downward to and through a motor 38. The portion of the shaft 36 which runs through the motor 38 has external teeth 37 which mesh with complementary teeth on the motor 38. The teeth 37 couple the shaft 36 to the motor 38 for rotation with the latter while nevertheless permitting the shaft 36 to move longitudinally relative to the motor 38.

As shown in FIG. 2, the turntable 34 is a plunger-like or piston-like member which is shiftable between a lowered rest position indicated by full lines and a raised operative position indicated by broken lines. In the lowered position, the upper surface of the turntable 34, on which the copy sheets rest, is flush with the upper surface 22 of the copy sheet support. An electromagnetic device 35 acting on the shaft 36 functions to move the turntable 34 between the lowered and raised positions. The turntable 34 is normally maintained in the lowered position.

The turntable 34 is provided with suction apertures 39 which establish communication between the upper surface of the turntable 34 and the interior of the hollow shaft 36.

A suction or vacuum generator 40 such as a pump or fan is located beneath the motor 38. The suction generator 40 is in communication with a suction or vacuum chamber 29 disposed below the upper run of the conveyor belt 25 and with a suction or vacuum chamber 30 disposed below the upper run of the conveyor belt 26. The suction generator 40 further communicates with the interior of the hollow shaft 36. When the suction generator 40 operates, air is drawn out of the suction chambers 29,30 in the directions of the arrows B while air is drawn out of the hollow shaft 36 in the direction of the arrow C. The air drawn out of the suction chambers 29,30 and the hollow shaft 36 is discharged to the atmosphere in the direction of the arrow D.

The shaft 36 may be telescopically connected to the suction generator 40 in order to permit up-and-down movement of the shaft 36 relative to the generator 40.

As illustrated in FIG. 3, the sheets 28 beneath the upper runs of the conveyor belts 25,26 are provided with slits 28a. The slits 28a allow the passages 27 and suction openings 33 in the belts 25,26 to communicate with the suction chambers 29,30. In order to control the suction in the openings 33, slides 41 are mounted underneath the sheets 28. The slides 41 are formed with slits 42 similar to the slits 28a, and the pattern of slits 42 in each of the slides 41 is the same as the pattern of slits 28a in the corresponding sheet 28. When the slits 42 are in register with the slits 28a, air can flow freely through the suction openings 33 and the passages 27 into the suction chambers 29,30. Suction is generated at the openings 33 so that a copy sheet lying on the conveyor belts 25,26 is attracted to and held on the belts 25,26. To bring the slits 28a,42 out of register, the slides 41 are shifted in the direction of the arrow E. Once the slits 28a,42 are no longer in register as shown in FIG. 3, the flow of air through the suction openings 33 and the passages 27 stops and the suction in the openings 33 is terminated. This enables a copy sheet resting on the conveyor belts 25,26 to be removed.

The suction in the suction openings 39 of the turntable 34 can be controlled in the same manner as the suction in the suction openings 33 of the conveyor belts 25,26. However, the linearly shiftable slide 41 is replaced by a non-illustrated rotatable disk.

The bottom of the copy sheet support is provided with a pair of parallel grooves 12 and 13. The groove 12 accommodates the lower run, and is in alignment with the groove 23 which receives the upper run, of the conveyor belt 25. Similarly, the groove 13 accommodates the lower run, and is in alignment with the groove 24 which receives the upper run, of the conveyor belt 26.

A holder 1 is secured to the bottom of the copy sheet support. The holder 1 carries removable brushes or cleaning members 2 and 3 which are in continuous contact with the conveyor belts 25,26.

The copy sheet support is located in a non-illustrated housing, and an arm 4 is mounted on the housing adjacent the support by way of a pivot 5. The pivotal arm 4 has a free end remote from the pivot 5, and a cleaning member 6 is secured to the free end of the arm 4. The cleaning member 6 can be made of rubber and may be a brush.

The arm 4 can be pivoted between the illustrated inoperative position and an operative position in which the cleaning member 6 can contact the turntable 34. A control unit 7 is connected to the arm 4 and regulates its movement. The control unit 7 is also connected to the motor 38 and the electromagnetic device 35.

The operation of the apparatus of FIGS. 1–3 is as follows:

When a copy sheet is moved onto the copy sheet support, e.g., from a copy paper cassette, the slits 28a,42 are brought into register so that suction is generated in the suction openings 33 of the conveyor belts 25,26. The copy sheet is thus attracted to and held on the conveyor belts 25,26. The motor which drives the roller 32 is started and the conveyor belts 25,26 are set in motion to draw the copy sheet into the copying station. The copy sheet is centrally positioned in the copying station by a non-illustrated aligning mechanism and a copying procedure is thereupon performed with the copy sheet. The copy sheet overlies the turntable 34 and, during the copying procedure, suction is generated in the suction openings 39 of the turntable 34. Following the copying procedure, the conveyor belts 25,26 are restarted and convey the copy sheet out of, in the same direction as it entered, the copying station. After leaving the copying station, the copy sheet is introduced into a developing unit.

While the conveyor belts 25,26 advance, adherent particles are continuously removed therefrom by the brushes 2,3. The particles removed from the conveyor belts 25,26 are collected in a non-illustrated vessel disposed below the brushes 2,3.

The turntable 34 is maintained in its lowered position during operation of the conveyor belts 25,26 and during copying. If a copy sheet is to be rotated on the copy sheet support, the suction in the suction openings 33 of the conveyor belts 25,26 is shut off once the copy sheet has been properly positioned in the copying station. On the other hand, suction is generated in the suction openings 39 of the turntable 34. The electromagnetic device 35 is then activated to lift the turntable 34 to its raised position together with the copy sheet. When the turntable 34 is in its raised position, the motor 38 is operated to rotate the turntable 34 through 90 degrees. Following rotation, the electromagnetic device 35 returns the turntable 34 to its lowered position. To transport the copy sheet to the developing unit, the suction in the suction openings 33 of the conveyor belts 25,26 is turned on again whereas the suction in the suction openings 39 of the turntable 34 is terminated.

There are different reasons for rotating a copy sheet. On the one hand, the copy sheet may be rotated in order to permit copying of an image having a different format than previously. On the other hand, the copy sheet may be rotated to allow better utilization of the developing unit. Thus, for rectangular copy sheets, it may be better to advance the copy sheets transverse to their long dimension.

The turntable 34 can, for example, be cleaned every time a copy sheet leaves the copying station. To clean the turntable 34, the arm 4 is pivoted downward from its inoperative to its operative position. The turntable 34 is thereupon moved to its raised position thereby causing the turntable 34 to contact the cleaning member 6. The turntable 34 is now rotated back-and-forth several times to effect relative movement of the cleaning member 6 and the turntable 34 and a resultant loosening of all the dirt particles adhering to the turntable 34. The suction generator 40 preferably operates during the cleaning procedure to remove the loosened particles from the turntable 34 and evacuate them from the apparatus.

In addition to the cleaning member 6, a calibrating or measuring filter can be mounted on the pivotal arm 4. The arm 4 can then be used to swing the filter into the optical path for calibration of the copying equipment.

Figure 4:
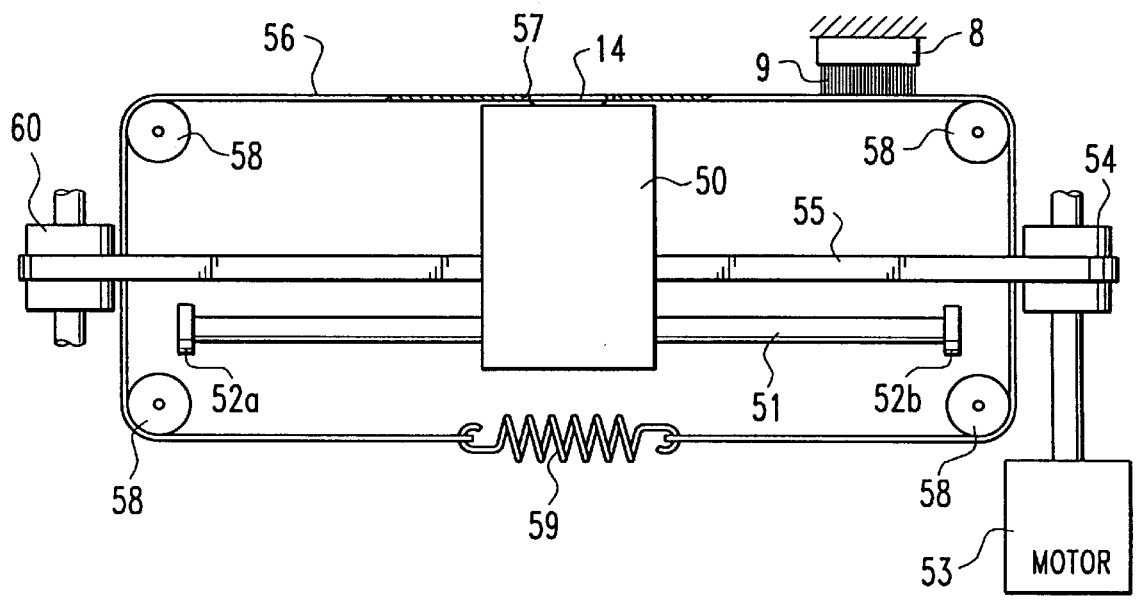
FIG. 4 is a side view of a copy material support unit in another copying station according to the invention.

FIG. 4 illustrates another embodiment of an apparatus in accordance with the invention. Here, a turntable or rotational platform 14, together with a non-illustrated drive for rotating the same, is installed in a carriage 50. The carriage 50 is movable linearly along rods 51 which guide the carriage 50 for movement. The ends of the rods 51 are equipped with abutments 52a and 52b.

The turntable 14, which constitutes a carrier for copy sheets, is provided with suction openings which communicate with a non-illustrated suction generator again installed in the carriage 50.

A drive for displacing the carriage 50 includes a toothed belt 55 which engages the carriage 50. The belt 55 passes around two rollers or gears 54 and 60 of which the roller 54 is driven in rotation by a reversible motor 53.

A band or belt 56 is connected to the carriage 50 and passes around four rollers 58 which guide the belt 56 below the carriage 50. The band 56 has a cutout 57 for the turntable 14, and the upper surface of the turntable 14 is flush with the upper surface of the band 56. To simplify mounting of the band 56, it is preferred that the band 56 not be endless. Rather, the band 56 advantageously has two ends which are connected to one another by a spring 59.

To make a copy, the carriage 50 is shifted left in FIG. 4 to the abutment 52a. The band 56 moves counterclockwise as the carriage 50 moves left. Once the carriage 50 is positioned against the abutment 52a, a copy sheet is deposited on the turntable 14. The suction generator in the carriage 50 is then turned on to draw and hold the copy sheet against the turntable 14. The carriage 50 is now moved away from the abutment 52a to a copying location between the abutments 52a,52b.

The carriage 50 may have support surfaces which are disposed next to the turntable 14 on either side of the band 56, and such support surfaces can be provided with additional suction openings. Similarly, additional suction openings may be formed in the portions of the belt 56 adjacent the turntable 14. The additional suction openings allow a copy sheet to be subjected to suction over its entire area if the copy sheet projects beyond the turntable 14. When a copy sheet of this type is supported on the turntable 14, the entire copy sheet is placed under suction as soon as the copy sheet is properly positioned at the copying location.

A copy sheet on the turntable 14 is exposed at the copying location and may also be rotated through 90 degrees by the turntable 14 if required by the format of the image to be copied or for better utilization of the developing unit. When the suction in the additional suction openings is off and the suction exerted on the copy sheet by the turntable 14 is sufficiently strong, it is unnecessary to raise the turntable 14 for rotation of the copy sheet.

After a copy sheet has been exposed, the carriage 50 is returned to the abutment 52a where the exposed copy sheet is removed.

As mentioned previously, the copying location is situated between the abutments 52a,52b. A cleaning unit is disposed to the same side of the copying location as the abutment 52b, that is, to the side of the copying location remote from the location at which copy sheets are deposited on and removed from the turntable 14. The cleaning unit includes a holder 8 which retains a cleaning member 9 in such a manner that the cleaning member 9 is in continuous contact with the band 56.

To clean the turntable 14, the motor 53 is switched on to drive the carriage 50 towards the abutment 52b. When the turntable 14 is directly below the cleaning member 9, the carriage 50 is stopped and the turntable 14 is rotated back-and-forth several times to loosen adherent particles. The suction generator for the turntable 14 is preferably switched on during the cleaning procedure in order to draw off the loosened particles immediately. The interval between two cleanings depends strongly on the way in which the apparatus is used, and cleaning of the turntable 14 can be carried out periodically or after specific operations.

I claim:

1. A method of operating with a carrier for photographic material, comprising the steps of attracting at least one article of photographic material to said carrier; moving said carrier during the attracting step to displace said one article; removing said one article from said carrier; attracting a second article to said carrier; and cleaning said carrier automatically, the cleaning step being performed between the removing step and the step of attracting said second article.

2. The method of claim 1, wherein the attracting step is performed using suction.

3. An arrangement for displacing photographic material, comprising a movable carrier; means for attracting the photographic material to said carrier; a cleaning member for automatically cleaning said carrier; means for bringing said cleaning member and said carrier into and out of engagement with one another, said cleaning member and said carrier having respective surfaces which contact one another when said cleaning member and said carrier are in engagement; and means for causing relative movement of said surfaces during engagement of said cleaning member and said carrier.

4. The arrangement of claim 3, wherein said attracting means comprises a source of suction.

5. The arrangement of claim 3, wherein said carrier comprises an endless band.

6. The arrangement of claim 3, wherein said carrier comprises a piston-like member.

7. The arrangement of claim 3, wherein said bringing means comprises a lever, said cleaning member being mounted on said lever.

8. An arrangement for displacing photographic material, comprising a movable carrier; means for attracting the photographic material to said carrier; a cleaning member for automatically cleaning said carrier; means for bringing said cleaning member and said carrier into and out of engagement with one another, said bringing means including a lever, and said cleaning member being mounted on said lever; and a filter on said lever.

\* \* \* \* \*